United States Patent [19]

Biard

[11] Patent Number: 5,148,303
[45] Date of Patent: Sep. 15, 1992

[54] DELAY LINE FIBER OPTIC SENSOR
[75] Inventor: James R. Biard, Richardson, Tex.
[73] Assignee: Honeywell Inc., Minneapolis, Minn.
[21] Appl. No.: 648,076
[22] Filed: Jan. 31, 1991
[51] Int. Cl.[5] .......................................... H04B 10/00
[52] U.S. Cl. .................................. 359/170; 359/143; 359/179; 250/227.21
[58] Field of Search .................... 455/603, 605, 612; 250/227.16, 227.14, 227.19, 227.21; 340/870.28, 870.04; 359/111, 143, 159, 168, 173, 174, 177, 179, 170

[56] References Cited

U.S. PATENT DOCUMENTS 4,356,396 10/1982 Ruell et al. .................... 250/231.19
4,857,727 8/1989 Lenz et al. .................... 250/277.23
4,931,636 6/1990 Higgens .
4,958,929 9/1990 Kondo .
4,995,697 2/1991 Adamovsky .

OTHER PUBLICATIONS

Artile "Optical-fiber sensors challenge the competition" Sep. 1986 published in IEEE Spectrum, author-Giallorenzi et al.
Article: "A Fiber Optic Sensing System Based on Spectral Modulaton" Oct. 13–16 ISA 86 Conference, author, Saaski et al.
Paper: "Optically Powered Sensors A Systems Approach to Fiber Optic Sensors" dtd. Apr. 24, 1987 author Bjork and Lenz.
Article: published Nov. 11, 1982 in Electronics Letters entitlted "Fibre-Optic Variable Delay Lines" authors, Bowers et al.
Thesis by Robert Eugene Larson entitlted "Universal Signal Processing Method for Multimode Reflective Sensors" Dec. 1988.
Article: "An Interview with Alan Harmer on Fiber Optics, Sensors, and Emerging Markets" Jun. 1987 edition of Optical Engineering Reports.
Article: entitled "Fiber Optic Sensors Offer Advantages for Aircraft" appeared Jun. 1987 issue of Optical Engineering Reports, author: Lewis.

Primary Examiner—Edward L. Coles, Sr.
Assistant Examiner—Rafael Barares
Attorney, Agent, or Firm—Charles L. Rubow

[57] ABSTRACT

A fiber optic sensing apparatus is provided to measure the relative reflections of two temporarily displaced signals. One of the signals is a reference signal and the other signal represents the magnitude of a sensed variable. A reference mirror is disposed at a preselected position along an optical fiber between a transmitter/receiver and a sensor mirror. The transmitter provides an energy pulse into a first end of the optical fiber. When the energy pulse encounters the reference mirror, a first portion of the energy pulse is reflected back toward the receiver which is located at the first end of the optical fiber. The remaining portion of the energy pulse continues toward the sensor mirror. A second portion of the energy pulse is reflected by the sensor mirror. The second portion is of a magnitude that is analogous to the sensed parameter. Fiber optic delay lines are provided between the reference mirror and the transmitter/receiver and also between the reference mirror and the sensor mirror. The delayed lines separate the reference pulse and signal pulse from other pulses which are caused by reflections at other components within the optical fiber, such as bulkhead connectors.

4 Claims, 8 Drawing Sheets

DELAY LINE FIBER OPTIC SENSOR

BACKGROUND OF THE INVENTION

In recent years, there have been major advances in the design of aircraft structures. The most notable is the use of composite materials to replace the protective metal skins on the aircraft's wings. A design problem occurs with the use of composite materials, the protection from electromagnetic (EMI) and radio frequency interference (RFI) that the metal skins provide is lost. This interference will not allow conventional electronic sensors to be used with composite materials. In order to solve this unique design problem new sensor technologies have to be explored.

The new technology of fiber optic communications has created an emerging area of research in the use of optical fibers as sensing elements or in sensor systems. Fiber optic based sensors offer immunity to electromagnetic and radio frequency interference, increased sensitivity, larger bandwidths, high data transfer rates, compatibility with existing fiber telemetry, high melting point, and geometric versatility. These characteristics make fiber optic sensors an ideal choice to use in composite wing aircraft.

Existing fiber optic sensors require unique transmitter-receiver units configured for the individual sensor. An inexpensive transmitter-receiver unit that would allow the interchanging of sensors without redesigning the electronic circuitry is very desirable. Fiber optic cables allow the transmission and receiving of signals over the same cable by different modulation methods. However, it is desirable to select one modulation scheme to reduce the complexity of the design.

The two main modulation schemes used in sensor applications are phase and amplitude modulation. Phase modulation allows higher sensitivity, but the sensor configuration is complicated and requires the use of expensive lasers and single mode fibers. Amplitude modulation trades sensitivity for low cost and ease of configuration by using light emitting diodes and multimode fibers. A fiber optic based sensor using amplitude modulation would provide a simple, low cost solution to the interference problem inherent in the use of composite materials.

Development of optical fiber sensors started around 1977. Since then acoustic, magnetic, pressure, acceleration, temperature, gyro, displacement, fluid level, torque, current, strain and stress sensors are among the fiber optic sensors that have been developed. These were developed using either single or multimode fibers and incorporated many different modulation schemes.

Multimode fiber sensors have advanced very rapidly due to the low cost of the fiber, alignment systems, sources, detectors, and simpler configuration. There are temperature sensors based on the temperature-dependent optical absorption property of semiconductor materials, current transformers based on the magneto-optic Faraday effect, voltage transformers based on the electro-optic Pockels effect, and pressure sensors based on microbending losses just to name a few.

Displacement sensors using multimode fibers have been developed using microbending induced mode coupling of core to cladding modes, speckle dynamics, and Michelson interferometric methods. Adamovsky has researched a fiber optic displacement sensor with spatially separated signal and reference mirrors. This research involved using frequency domain referencing of the relative amplitudes of the signal and reference frequencies as a function of displacement. Adamovsky demonstrated the detection of the relative amplitudes of the signal and reference frequencies by analyzing different portions of the fourier signal spectrum. The limitation of this scheme is that the signal processing is significantly effected by non-repeatable fiber/fiber connector losses. These connector losses occur at bulkhead connectors which are inherant in any practical fiber optic sensing system.

SUMMARY OF THE INVENTION

A program was instituted in 1986 to study fiber optic sensors. This program was primarily directed toward military and commerical aircraft which have similar environmental requirements. One of the aims of this project was to evaluate the various schemes proposed for fiber optic sensors with respect to their viability in the hostile environments encountered in military systems. Fiber optic sensors that are completely passive at the point of sensing would be very useful as an alternate sensor technology. This passive feature is important to eliminate EMI and RFI problems and to render sensors insensitive to lightning damage and countermeasures. This latter pair of considerations is particularly important in modern aircraft where the use of composite wing structures removes the electrostatic shield associated with traditional metal skin aircraft.

In order to achieve the greatest utility, a wide spectrum of fiber sensors and switches are required. Some of the more common variables that require sensing are:
1. Temperature—set point switch and analog
2. Humidity—set point switch and analog
3. Pressure—set point switch and analog
4. Presence—switch
5. Position—high-resolution analog or digital for linear and rotary
6. Motion—high-resolution velocity and direction for linear and rotary It would be very desirable, for low cost and ease of maintenance, if all of the above fiber optic sensors shared a common decode scheme; a small number of decode schemes would be acceptable.

A viable fiber optic sensor technique must be easy to install. This implies that it must be tolerant of fiber/fiber bulkhead interfaces. The lack of reproducibility of loss at pluggable fiber optic bulkhead connectors and the tendency of light sources to vary in intensity with time and temperature seem to rule out all those fiber optic sensor schemes that depend directly on the analog amplitude of light returned from the point of sensing.

Fiber optic sensors that require single mode CW laser diodes and single mode fiber seem undesirable for hostile military and commerical environments. The difficulty of alignment associated with the small core diameter of single mode fiber and the need to control the CW laser diode temperature add cost and complexity to the sensor and raise questions about reliability. These issues can probably be resolved for a significant sensor like a fiber ring gyro. However, for the host of autonomic sensors required in a complex system, cost, complexity, and reliability issues are very important.

The ideal fiber optic sensor has the following characteristics:
(1) It uses multimode fiber and LED's with PIN or APD photodetectors.

(2) The sensor information (analog or digital) is encoded as relative amplitudes of color, polarization, or time resolvable pulses.

(3) It uses a single fiber (or at most two fibers) to communicate between the decode electronics and the point of sensing.

The first characteristic exploits the most mature fiber optic technology available; this ensures low cost and good sensor reliability in hostile environments. The second and third characteristics taken together are necessary to achieve sensor calibration and performance that is independent of fiber loss, connector loss, and LED output power. The optical information returned from the point of sensing needs to be contained in the relative amplitudes of two or more signals and not in the absolute amplitude of one optical signal. This gives a form of quieting similar to FM radio. If the return signals are large enough compared to the optical receiver noise, then the sensor will work correctly and calibration will not be dependent on the absolute amplitudes of the return signals. The third characteristic also contributes to low cost by limiting the amount of fiber required in the sensor.

It should be noted that the sensor is not required to use the fiber as the sensor element. In fact, many viable sensing schemes might use the fiber as the information conduit between the decode electronics and the point of sensing. In these cases it may also be possible to perform the same sensing function by optoelectronic means without the use of fiber optics. Such optoelectronic sensors may have independent utility.

DELAY LINE SENSOR

Small motion (or no motion) sensors is the category used to describe fiber optic sensors for things like temperature, humidity, and pressure. These sensors often have requirements for analog outputs and may require high resolution. Several schemes have been proposed for small motion sensors using sensor elements at the end of a single fiber or pair of fibers that operate on the light sent to the sensor in a way that encodes the desired information in two or more resolvable components such that the sensor calibration is independent of the absolute amplitude of the optical signal. The most promising of these schemes uses optical fiber as a delay line. This delay line technique will work with LEDs and multimode fibers. The same basic technique also works equally well as a large motion sensor. An embedded microprocessor will be required to linearize and calibrate the delay line sensor.

The delay line decode scheme uses a sensor element at the end of the fiber that changes its reflection coefficient in response to the variable being sensed. This signal is compared to the reflection from a fixed mirror. The two reflected signals are resolved in time by use of a fiber delay line between the fixed mirror and the sensor element. The sensor is periodically interrogated by pulsing the LED with an optical pulse width equal to or less than the round trip delay of the fiber optic delay line. The analog data from the sensor is encoded in the ratio of the amplitudes of the two pulses. In this way, the calibration of the sensor is independent of the absolute amplitude of the optical signal provided that signal is above the noise limit set by the optical receiver.

The major advantage of the delay line sensor is its potential insensitivity with respect to LED wavelength. Another advantage is the temporal separation between the sensor reflections and reflections from bulkhead connectors. It should be possible to implement this sensor scheme using a single fiber; it may be possible to use all or part of the fiber between the decode electronics and the sensor as the fiber optic delay line.

The major disadvantage of this scheme is the large bandwidth optical receiver required to resolve the two pulses and the resultant decrease in receiver sensitivity. The receiver bandwidth and sensitivity can be traded directly for the cost of the fiber optic delay line. For low duty cycle operation, it should be possible to partially offset the noise of the wide-band receiver by pulsing the LED at higher currents.

A significant improvement in sensitivity can be achieved by limiting the bandwidth of the sensor function. Useful bandwidth limiting can be accomplished by averaging the response over many LED pulses. For example, if the LED pulse width is 60 ns, the analog bandwidth of the receiver must be about 15 MHz to avoid interference between the two return pulses generated by each LED pulse. The LED can be pulsed at a 1.0 MHz rate if the total fiber length is not more than 333 ft. This pulse rate updates the sensor reading every microsecond. However, if the sensor only requires a reading each millisecond, then the output can be averaged over 1000 LED pulses. This averaging process will reduce the noise bandwidth of the sensor by the square root of the number of pulses included in the average. For this case, averaging would improve the sensitivity by a factor of 31.6 (15 dB). This averaging process can be achieved by analog or digital means with equal effect. The resolution of the sensor can be improved by averaging over more pulses. This means that the delay line sensor offers the possibility of trading bandwidth for resolution.

BRIEF DESCRIPTION OF THE DRAWINGS

The present invention will be more fully understood from a reading of the Description of the Preferred Embodiment in association with the drawings, in which.

DESCRIPTION OF THE PREFERRED EMBODIMENT

Figure 1:
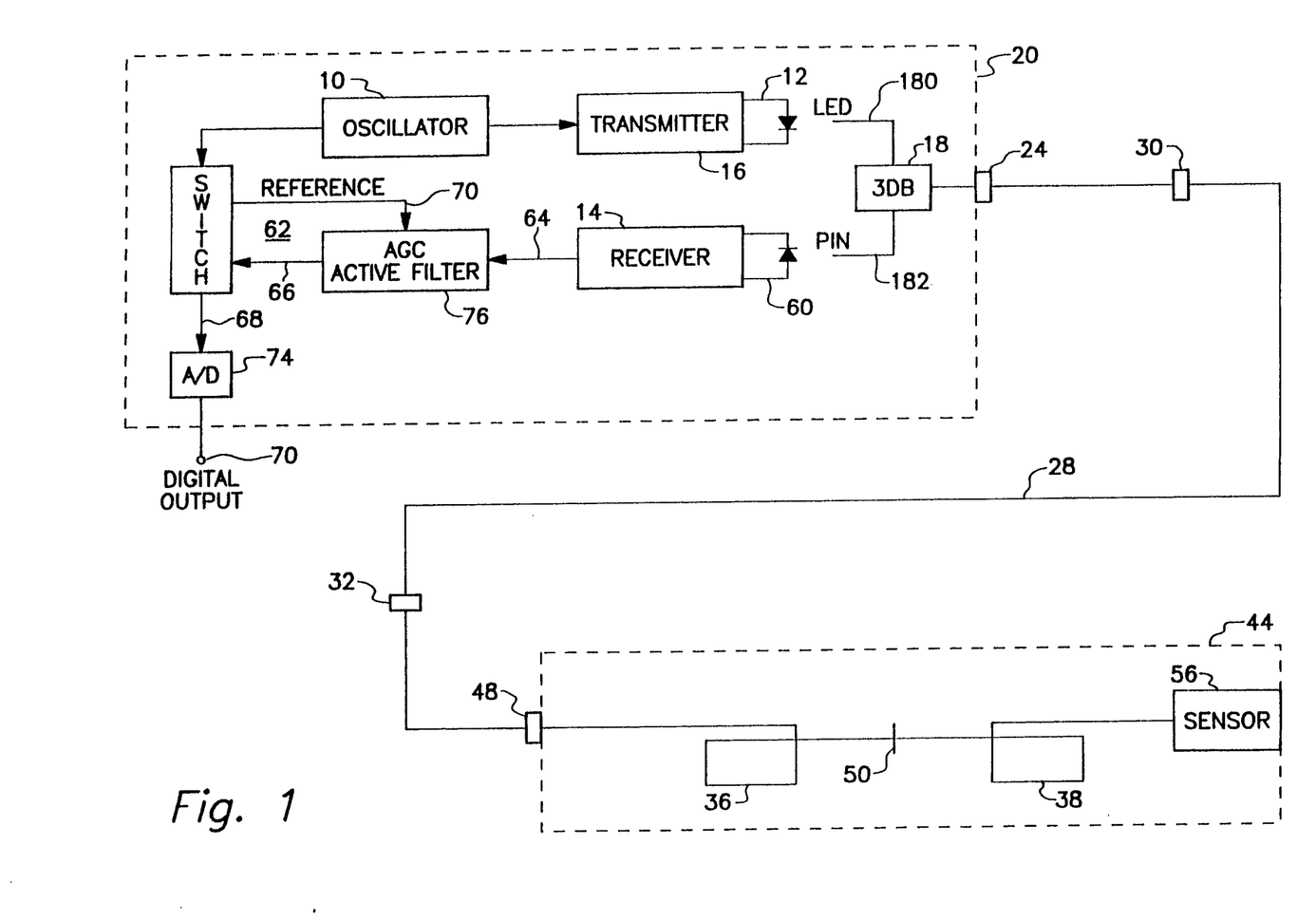
FIG. 1 illustrates a block diagram of a delay line sensor incorporating the concepts of the present invention.

A block diagram representation of a typical embodiment of the delay line sensor is shown in FIG. 1. The round-trip fiber delay is assumed to be 3 ns/ft. This corresponds to a fiber core index of refraction of 1.5. The system power budget presented in Table 1 assumes the use of 100 um graded index fiber with an attenuation of 4 dB/km. The oscillator 10 drives the transmitter LED 12 with a 60 ns pulse of current once each microsecond. This sets the maximum length of the fiber at 333 ft for a round-trip delay of 1.0 us. The oscillator 10 also drives a synchronous detector in the active filter following the optical receiver 14 and its photodetector 60. The oscillator 10, active filter 76, transmitter 16, receiver 14, and a −3 dB optical T-coupler 18 are all located in the electronics box 20. There is a single pluggable fiber interface 24 on the electronics box 20. It is connected to the sensor by up to 253 ft of 100 um graded index fiber 28. Two bulkhead connectors, 30 and 32, are assumed for calculating the system power budget.

Two 40 ft fiber delay lines, 36 and 38, are shown in the sensor box 44. The 40 ft length is used to produce a delay of 120 ns. This gives a 60 ns gap between pulses to eliminate intersymbol interference. The first delay line 36 insures that the front surface reflection from the pluggable interface 48 to the sensor box 44 does not interfere with the operation of the sensor. An accurate in-line mirror 50 with a reflectivity of 26.8% is located between the first 36 and second 38 delay lines. This mirror returns 26.8% (−5.7 dB) of the incident light pulse to the electronics box 20. This return from the reference mirror 50 is called the reference pulse.

Most of the incident light (73.2%) is transmitted by the reference mirror 50 and traverses the second delay line 38 to strike the sensor 56. The sensor 56 is specified to have a reflectivity that varies from 0% to 100% in response to a range of the variable being sensed. When the sensor mirror has a reflectivity of 50% the return signal in the second delay line is 36.6%. After passing the 26.8% reference mirror 50, the return signal to the electronics box 20 has an amplitude of 26.8% (−5.72 dB) of the incident pulse. This second pulse is delayed 120 ns from the reference pulse by the round-trip length of the second delay line 38. The use of a 120 ns fiber delay line also makes it possible to use a 100 ns time gate on each pulse. This insures that all of the charge from the reference pulse (and sensor pulse) is collected and reduces the noise bandwidth of the receiver.

It follows that the return signal from the sensor box 44 is made up of a 60 ns reference pulse followed by a 60 ns gap and a 60 ns variable amplitude sensor pulse. The sensor information is encoded in the relative amplitudes of the two sequential pulses. The variable amplitude pulse changes in amplitude from 0 to 53.6% (−2.72 dB) of the incident power as the sensor reflectivity changes from 0 to 100%.

TABLE 1

| Power Budget, Losses, & S/N | | |
|---|---|---|
| REFERENCE PULSE OPTICAL POWER BUDGET | | |
| LED Coupled Power<br>200 mA Current Pulse<br>60 ns Pulse Width<br>1.0 us Pulse Rate | 320 uW | −5.0 dBm |
| Receiver Sensitivity<br>15 MHz Bandwidth<br>100 ns Sample time<br>1.0 ms Integration Time<br>S/N = 1.0 | 141 pW | −68.5 dBm |
| Power Budget, S/N = 1.0 | 2.24 × 10⁶ | 63.5 dB |
| OPTICAL LOSSES | | |
| T-Coupler - 2 passes<br>Power Split = −3.0 dB<br>Excess Loss = −1.0 dB | −4.0 dB/pass | −8.00 dB |
| 4 Bulkheads - 2 passes<br>Excess Loss = −1.0 dB | −4.0 dB/pass | −8.00 dB |

TABLE 1-continued

| Power Budget, Losses, & S/N | | |
|---|---|---|
| Fiber Attenuation - 2 passes<br>100 um Core Diameter<br>0.1015 km/pass | −4.0 dB/km | −0.81 dB |
| Reference Mirror - 1 pass<br>Reflectivity = 26.8% | −5.72 dB | −5.72 dB |
| Power Margin | −3.47 dB | −3.47 db |
| TOTAL OPTICAL LOSS | | −26.00 dB |
| RECEIVED POWER & S/N | | |
| Max Reference Power | 794 nW | −31.00 dBm |
| Max Reference Current | 397 nA | — |
| Max Signal Power | 1589 nW | −28.00 dBm |
| Max Signal Current | 794 nA | — |
| Max Reference S/N | 5615/1 (Optical)<br>(Electrical) | 37.50 dB<br>75.00 dB |
| Max Signal S/N | 11229/1 (Optical)<br>(Electrical) | 40.50 dB<br>81.00 dB |

At a pulse current of 200 mA the HFE4000 AlGaAs LED is capable of coupling 320 uW (−5 dBm) of optical power to the fiber; this value is entered in Table 1. A 60 ns LED pulse requires an analog bandwidth in the receiver of 15 MHz. With present bipolar circuit design techniques, this receiver will have an equivalent mean square input noise current spectral density of $$ina^2/\Delta f = 10^{-24} A^2/Hz \tag{1}$$

With a sample time of 100 ns, the rms value of the equivalent input noise current is $$ina = 2.24 nA \tag{2}$$

The HFD3002 PIN photodiode 60 has a responsivity of 0.5 A/W when coupled to 100 um fiber. With this receiver/photodiode combination the optical power at the receiver 14 for S/N−1.0 is 4.48 nW (−53.dBm). When receiver output is averaged over 1000 LED pulses the equivalent input noise current is reduced by a factor of 31.6 to 70.7 pA. With averaging, the optical power at the receiver for S/N−1.0 is 0.1414 nW (−68.5 dBm). In this context, S/N refers to the ratio of peak signal current to rms noise current at the photodiode/receiver interface. This receiver sensitivity is entered in Table 1. The total power budget with averaging is 63.5 dB.

OPTICAL LOSSES

The T-coupler 18 in the electronic box 20 is a −3.0 dB power splitter. These fiber optic components usually have about 1.0 dB of additional insertion loss. Thus, for two passes through the T-coupler 18 the signal loss is −8.0 dB. This value is recorded in Table 1. The two bulkhead connectors, 30 and 32, are assumed to have −1.0 dB loss each. For two passes through the two bulkhead connectors the total loss is −4.0 dB. This value is recorded in Table 1. The loss at the pluggable connections, 24 and 48, at the electronics box 20 and the sensor box 44 is the same as the loss at the bulkhead connectors. For two passes through the two box connectors, 24 and 48, the total loss is − 4.0 dB. This value is recorded in Table 1. At an attenuation of −4 dB/km and a maximum fiber length of 333 ft (101.5 m) the round-trip fiber attenuation is −0.81 dB. This value is recorded in Table 1.

Table 1 also includes a power margin entry of −3.47 dB. This margin is used to accommodate variations in components, temperature effects, and LED degradation. A margin of −3.0 dB to −4.0 dB is usually adequate for present components. The particular value of −3.47 dB was selected to round off the total optical losses to −26 dB as shown in Table 1. With this total optical loss and a power budget of 63.5 dB, the margin left for S/N is 37.5 dB. This corresponds to a numeric ratio of S/N=5615/1. The power in the received reference pulse is expected to be 794 nW (−31 dBm); the current in the photodiode 60 in the reference pulse is 397 nA.

SENSITIVITY

There are several different ways that the two pulses returned from the sensor box 44 can be decoded to give the desired sensor output. For purposes of this analysis it will be assumed that each of the two pulses will be switched into separate integrating capacitors. Each integrating capacitor will have an appropriate shunt resistor to determine the continuous integration time. The sensor signal will be averaged over 1000 LED pulses. The reference signal will be averaged over more than 10,000 LED pulses to minimize the noise on the reference signal.

The reference signal will be used in an AGC loop 62 to control the linear gain of the receiver chain made up of devices 14 and 76. The gain will be controlled in such a way that the reference signal is held at a constant value at the output 66 of the receiver chain. The sensor signal is amplified by the AGC gain established by the reference signal 70. Thus, the sensor signal will have a constant full scale value independent of the absolute value of the optical signal on the PIN photodiode 60. Finally, the filtered and gain adjusted sensor signal will be converted to a digital number output 70 by an A/D converter 74. The mirror reflectivities described for this typical case give a signal-to-reference pulse ratio that varies between 0 and 2 for the range of the input variable accommodated by the sensor.

The pulse amplitudes applied to the AGC 76 and A/D converter 74 will consist of both signal and noise. The noise voltages used are the averaged values. The noise samples for the two sequential pulses are uncorrelated. Thus, the averaged noise values are also uncorrelated. Since the noise samples are in general different, the notation used will maintain the distinction between the two noise voltages. The two noise voltages are produced by the same receiver 14. However, they can have different values because of the different filter bandwidths used for the two signals.

The averaged voltages for the two pulses can be written as $$Va = Vs + en1 \quad (3)$$

$$Vb = Vr + en2 \quad (4)$$

where
Va is the sensor pulse with noise,
Vb is the reference pulse with noise,
Vs is the ideal sensor pulse,
Vr is the ideal reference pulse,
en1 is the noise in the sensor pulse, and
en2 is the noise in the reference pulse.
The desired ration output is $$Va/Vb = (Vs+en1)/(Vr+en2) \quad (5)$$

which reduces to $$Va/Vb = (Vs/Vr)(1+en1)/(Vs+en2/Vr) \quad (6)$$

Let R be the desired ration given by $$R = Vs/Vr \quad (7)$$

Then Eq (6) becomes $$Va/Vb = R(1+en2/Vr) + en1/Vr \quad (8)$$

The noise source en2 can be reduced to a negligible size by limiting the noise bandwidth on the reference channel. The reference channel controls the receiver AGC 76. It only needs to respond to things like changes in temperature and LED degradation and, therefore, does not need the full bandwidth of the sensor channel. With extra filtering on the reference channel, Eq (8) reduces to $$Va/Vb = R + en1/Vr \quad (9)$$

The margin for S/N shown in Table 1 is the inverse of the last term of Eq (9)

$$S/N = Vr/en1 = Ir/in1 \quad (10)$$

where in1 is the rms value of the equivalent input noise current at the photodiode/receiver interface when the sensor signal is maximum.

The sensitivity and S/N shown in Table 1 only include the effect of receiver noise. For large optical input signals the shot noise on the photocurrent can become larger than the receiver noise. When this occurs, the optical receiver 14 is background noise limited rather than amplifier noise limited. When the receiver 14 is background limited the performance can not be improved with a lower noise receiver. For example, in the background limited case, the use of an APD will not improve the performance of the system.

For background limited operation the sensor resolution can be improved by use of higher power from the LED 12 or by decreasing the system bandwidth. Both of these resolution improvements follow a square root relationship. Each factor of two improvement in resolution requires a factor of four increase in power or a factor of four decrease in bandwidth.

A resolution of ±1 least significant binary bit (lsb) is obtained when the input signal change for 1 lsb is 6 times the rms value of the noise voltage (or current). This S/N=6 is required at all resolution levels. The S/N required for different binary bit resolutions is shown in Table 2. The last column is in optical dB.

The shot noise due to the photodiode signal current will be highest for full scale signal from the sensor; R=2. Under these conditions the signal current will be two times larger than the reference current and the shot noise is given by $$ins^2 = 2q(2Ir)BW \quad (11)$$

where ins is the rms value of the shot noise due to the maximum photocurrent, q is the electron charge, and BW is the "white" noise bandwidth of the receiver 14.

Shot noise on the photodiode signal current is "white" noise. The "white" noise bandwidth of the receiver described above is determined by the 100ns integration time used to capture each

TABLE 2

| | S/N For Binary Bits of Resolution | | | |
|---|---|---|---|---|
| No. of Bits | Decimal Equiv | S/N For ±1 lsb | Total S/N (num) | Total S/N (opt dB) |
| 4 | 16 | 6 | 96 | 19.83 dB |
| 5 | 32 | 6 | 192 | 22.83 dB |
| 6 | 64 | 6 | 384 | 25.83 dB |
| 7 | 128 | 6 | 768 | 28.83 dB |
| 8 | 256 | 6 | 1536 | 31.83 dB |
| 9 | 512 | 6 | 3072 | 34.83 dB |
| 10 | 1024 | 6 | 6144 | 37.83 dB |
| 11 | 2048 | 6 | 12288 | 40.83 dB |
| 12 | 4096 | 6 | 24576 | 43.83 Db | pulse (BW=5.0 MHz). Combining Eq (11) with the constant input noise current of the receiver gives an expression for the total equivalent input noise current of the receiver as a function of the photodiode current from the reference pulse.

$$int^2 = (2.24nA)^2 + ins^2 \quad (12)$$

Eq (12) can be used to obtain an expression for S/N. it is more convenient to write the inverse expression for $(N/S)^2$. $(N/S)^2$ is obtained by dividing Eq (12) by $Ir^2$.

$$(N/S)^2 = (2.24nA/Ir)^2 + 4qBW/Ir \quad (13)$$

Eq (13) can be solved for Ir as a function of S/N using the quadratic formula. That solution was used to select the values of Ir used in FIG. 2.

Figure 2:
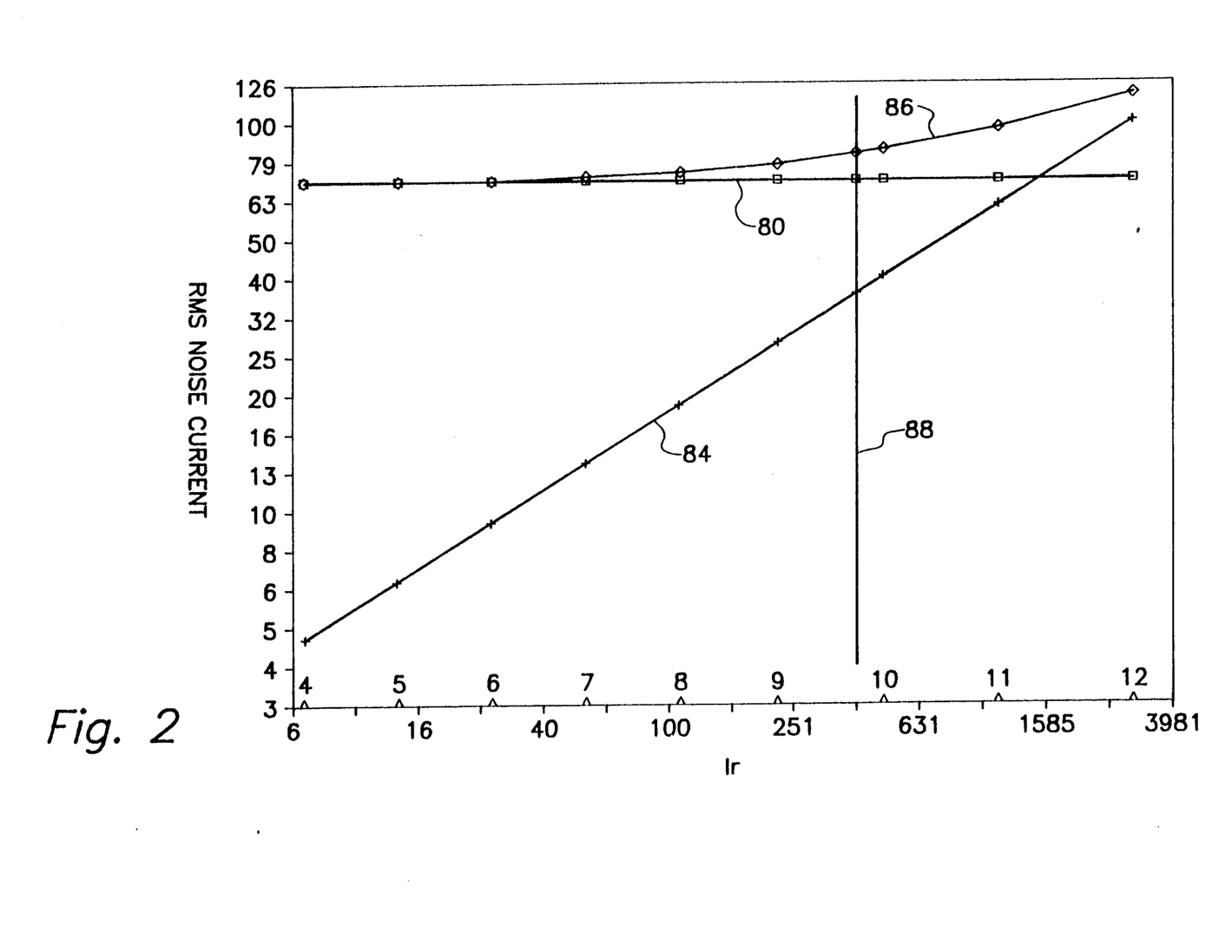
FIG. 2 is a graphical comparison of shot noise, receiver noise and total noise.

FIG. 2 shows plots of receiver noise 80, shot noise 84, and total noise 86 as a function of Ir. The numbers next to each value 88 of Ir represent the number of binary bits of resolution. The maximum expected value of Ir is also plotted in FIG. 2. With an integration time of 1.0 ms the delay line sensor is capable of 9 binary bits of resolution with a good power margin. Shot noise on the signal current is not negligible, and the delay line sensor is essentially background limited for 12 bit resolution.

A. Circuit Design and Preparation

The two major obstacles to overcome in order to obtain proper sensor system operation were the design of a triggering method that would allow an easy modification of the triggering times without modifying any of the electronics and the design of a large bandwidth fiber-optic receiver.

Since the signal processing method was based on the temporal separation of the reflected pulses, an easily modified triggering circuit was a system requirement. Aircraft applications in composite wings require the data transmission link length to be modified and relocated. For temporally separated signals, the modification of the length of the fiber changes the time delay and thus requires a modification of the sampling time of the reference and sensor pulses. The clock cycle of the triggering method also has to generate the transmitted pulse to eliminate any delay between separate clock cycles.

Figure 3:
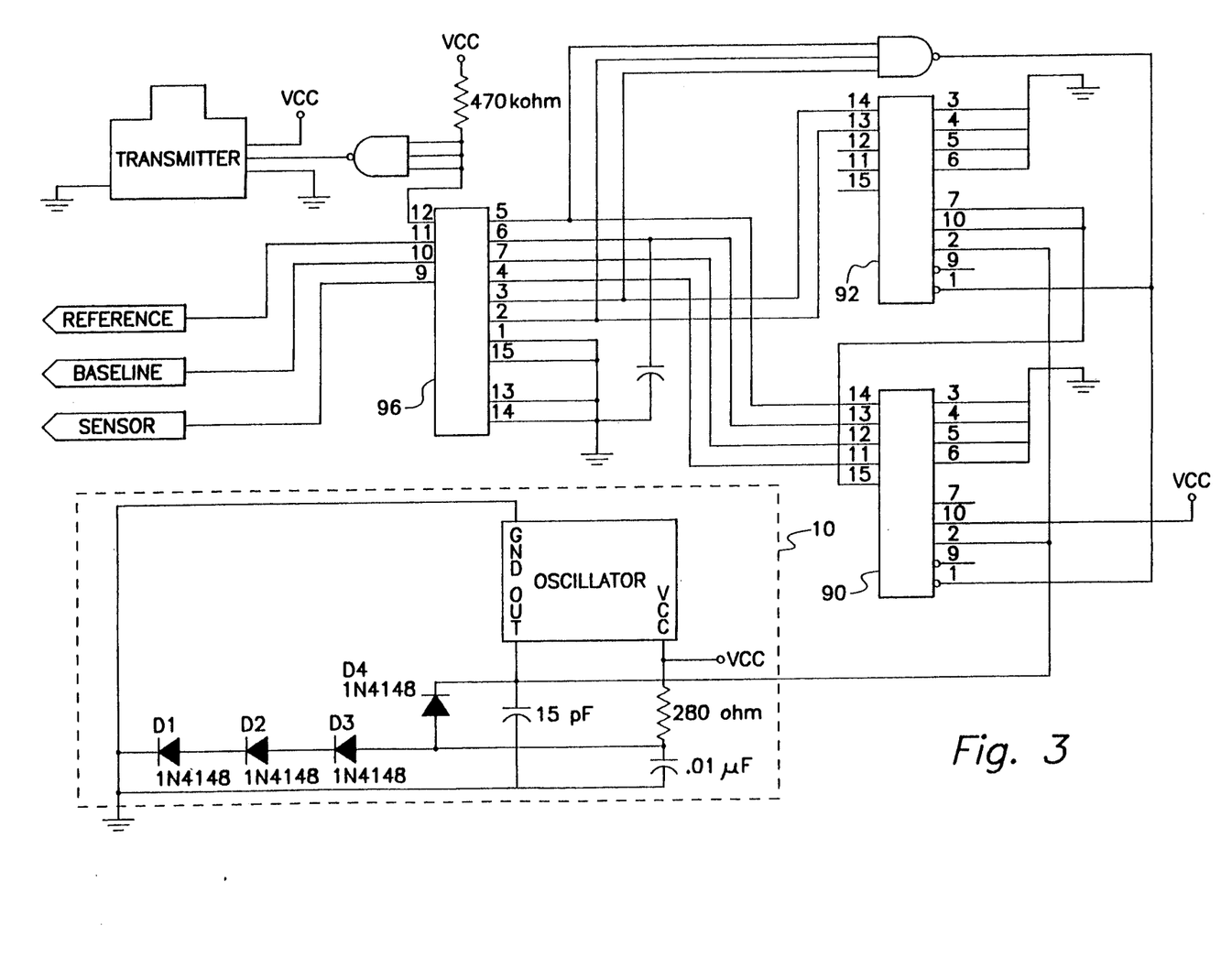
FIG. 3 shows a schematic illustration of a transmitter circuit suitable for use in association with the present invention.

A triggering method based on a standard 50 MHz oscillator, two 4-bit synchronous counters and a 256×4 PROM shown in FIG. 3 fulfilled all of these requirements. The 50 MHz oscillator 10 clocks the two cascaded 4-bit counters, 90 and 92, to step through 50 counts to provide the 1000 ns cycle desired. These in turn clock the PROM 96 through each of its memory addresses. By programming the proper 4-bit output code into the memory address of the PROM 96, the proper output line 0–3 is turned on or off. By allowing the first three memory addresses to be programmed high with the 0001 4-bit code, output line number one will be on for a duration of 60 ns. Using this method allows the triggering times of each of the sample and hold circuits to be modified by programming a new PROM and inserting it in the circuit. FIG. 3 shows the connection of the triggering circuitry with the Honeywell LED transmitter module 12.

Figure 4:
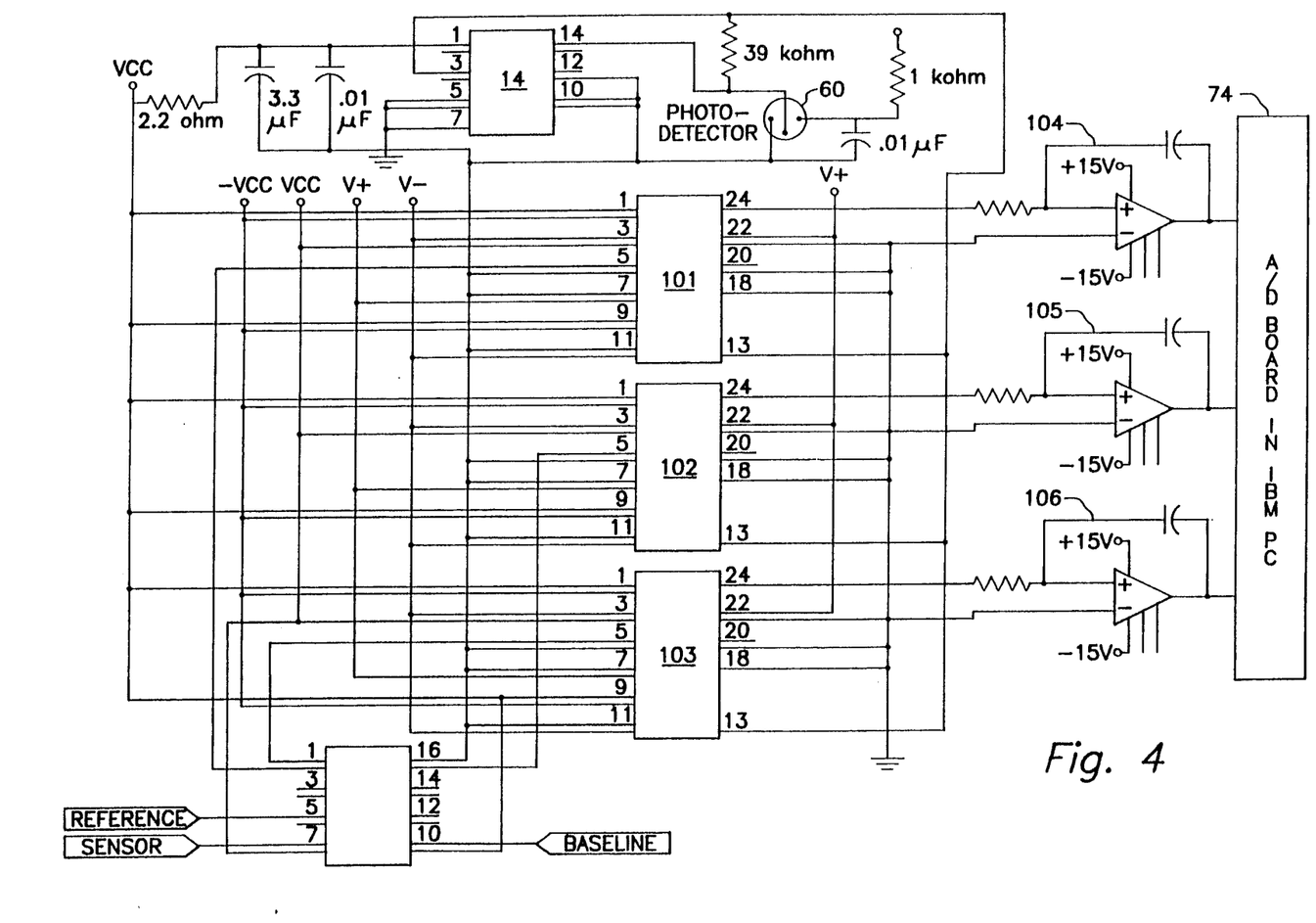
FIG. 4 shows a schematic presentation of receiver circuitry suitable for use in association with the present invention.

A commercially available fiber-optic receiver was acquired from National Semiconductor Corporation. The LH0082 Optical Communication Receiver/Amplifier 14 has a 600 MHz unity gain bandwidth, low noise, and >21dB dynamic range. The receiver is composed of a preamp and a comparator circuit on the same chip. Since the received signals are analog, the comparator part of the chip was not used.

One advantage of fiber optics that has been highly publicized is its low noise characteristic. This characteristic becomes a factor in the design of the receiver circuitry and the method by which the circuitry is implemented. For the LH0082, the problem area was the connection of the photodiode 60 to the input, pin 14 of the receiver. If this point is not properly isolated from any noise source then the sensitivity range of the receiver will be greatly reduced. In all of the circuit boards, a ground plane was used on both sides of the pcboard to reduce the noise from components. To further reduce the noise at the input of the receiver a cover made from brass shim stock was constructed, placed over the connection between the photodiode and the receiver input, and connected to the ground plane by screws. The cover gives a ground plane on both sides of the receiver input such that it provides optimum isolation. Low profile pcboard SMA component receptacles were used to allow the photodiode case to be tied to the ground plane.

The high frequency of the circuit, caused all circuitry to be tested on liquid etched pcboards designed on a computerized pcboard software package. To simplify the testing of the system, all circuits were individually tested in a stage manner to assure the correct operation of a stage before continuing. The transmitter and receiver circuitry were placed on separate pcboards in an attempt to isolate any induced noise from the 50 MHz free running oscillator. This allowed any circuitry problems to be isolated and resolved quickly.

FIG. 4 consists of a PIN photodiode 60, optical communications receiver (National LH0082) 14, biasing components for the receiver, three sample hold circuits, 101, 102 and 103, and the triggering lines provided by the PROM in the transmitter circuit. In this configuration, the PIN photodiode receives the reflections from each of the bulkheads and converts the optical power to electrical current. Then the receiver IC amplifies the signals and transmits them to the sample/hold circuits. The three triggering lines from the PROM were programmed with the proper 4-bit codes to enable each sample/hold at the proper sampling time in the 1000 ns cycle. Each of the sample and hold chips acquired a separate signal these were either baseline, reference mirror, or sensor mirror signals. Using the PROM's to enable the sample and hold circuits, allowed an easy method for quick modification of the sampling times without a modification of the electronics.

B. Fiber Data Link

FIG. 1 shows the fiber data link connection schematic. The fiber 28 was connected to the transmitter module through an Interfuse 2×2 directional coupler 18. It achieved this connection using 906 type SMA connectors through a bulkhead connector 24. The use of this connection method over fusion splicing of the fibers allows an easy connect—disconnect method for a fiber-to-fiber interface. There are two bulkhead connections, 30 and 32, in order to simulate the required number of connections needed in a composite wing aircraft. After the second connector 48 a 46 foot fiber delay line 36 was used in the prototype. A dielectric reference mirror 50 is spliced between the end of the first delay line 36 and a second 53 foot delay line 38. The end of the fiber was aligned perpendicular to the distance sensor mirror.

Each of the connectors or interfaces caused a reflection to occur. For a bulkhead connector, a 4.0% reflection was expected. The mirror reflectance should be of such a value as not to allow overlapping multiple reflections to occur that are greater than 0.1% of the 100% reflection from the sensor. Making the two delay lines, 36 and 38, of different lengths eliminated overlap of the corresponding signals.

C. Reference Mirror Fabrication

The fabrication of a reference mirror 50 was a two step process. The following paragraphs in association with FIG. 5, describe each of these processes.

Figure 5:
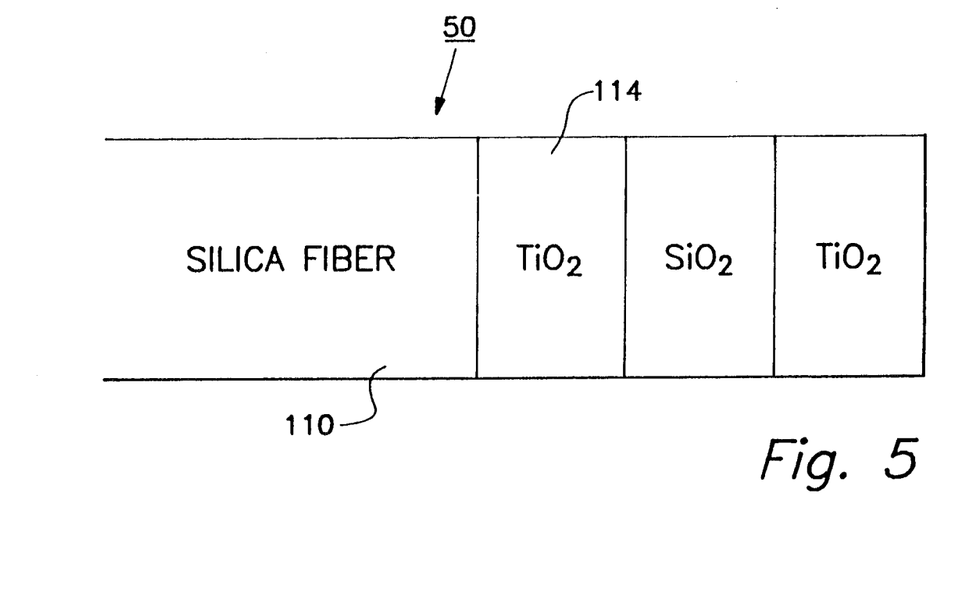
FIG. 5 illustrates a typical fiber mirror structure.

The first process involves the coating of a cleaved fiber 110 with a dielectric film 114 of $TiO_2$. This process was done by sputtering titanium in a mixture of approximately 70% argon and 30% oxygen which forms a film of $TiO_2$ on the end of the fiber. The thickness of the film affects its reflectivity. The maximum reflectivity occurs at the quarter wavelength of the operating wavelength of 850 nm. To increase the reflectance, multiple layers of this film are produced separated by layers of sputtered $SiO_2$. FIG. 5 shows the layer configuration of the coating used.

Figure 6A:
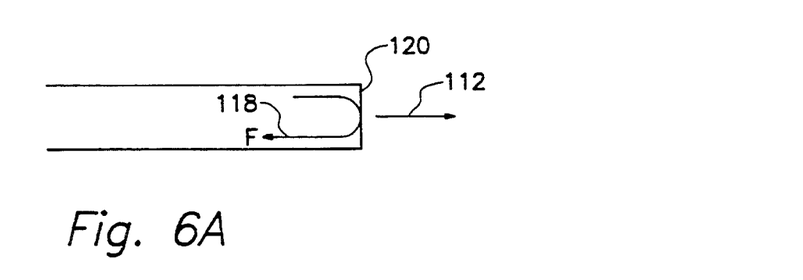
FIG. 6A, 6B and 6C illustrate reference mirror characterization steps that include measuring the Fresnel reflection, measuring reflectance and loss of coating and fabricated reference mirror measurements.

The second process was to characterize the coating to find its percent reflectance, transmittance, and loss. This was accomplished by using a 2×2 directional coupler to monitor the transmitted and reflected power. The characterization was a three step process shown in FIGS. 6A, 6B and 6C. The first step involves measuring a known reference reflectance 118, i.e. the 3.5% Fresnel reflection F 118 that is produced from a cleaved fiber surface 120 in air shown in FIG. 6A. By using the known 3.5% Fresnel reflection F 118 as a reference point, the characterization measurements were not dependent on the splitting ratio of the directional coupler. The total transmitted amplitude 122 was obtained by taking the measurement for the 3.5% Fresnel reflection F 118 and dividing by 0.035.

$$\text{Total Transmitted Amplitude} = F/0.035$$

Figure 6B:
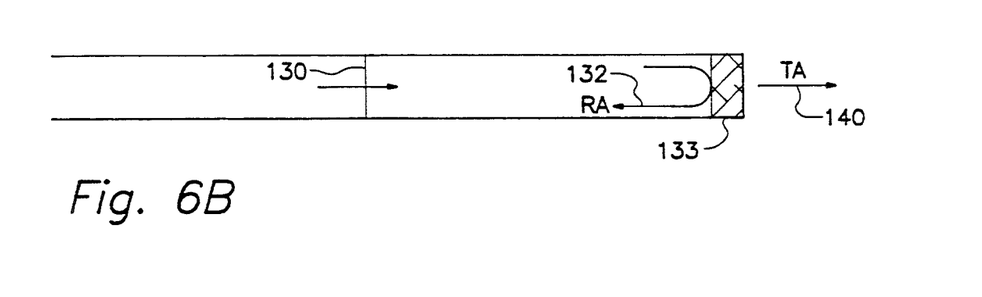
Figure 6C:
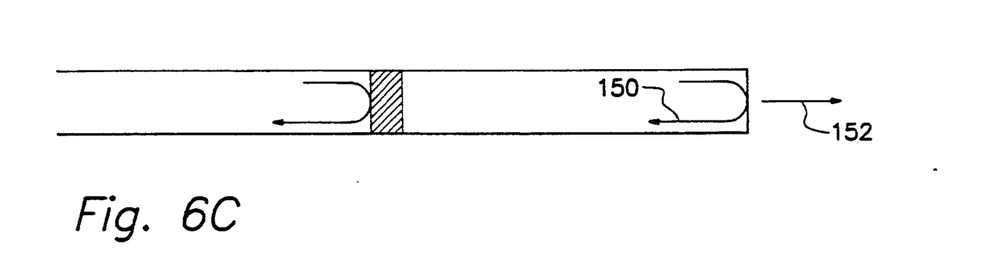

The second step involves taking the uncoated end of the coated piece of fiber and splicing it using an electrical arc splicer with the output leg of a 2×2 directional coupler shown in FIG. 6B. Assuming a lossless or low loss splice 130, the reflected amplitude was only from the reference mirror 133. The percent reflection 132 from the mirror (MR) was obtained by using a simple ratio of the two measurements multiplied by 3.5.

$$RM(\%) = (RA/F) \times 3.5 \tag{14}$$

The percent of transmitted amplitude (TA) was found in the same manner by $$TA(\%) = (TA/F) \times 3.5 \tag{15}$$

The percent loss of the film was obtained by the subtraction of the percent reflected 132 and transmitted 140 amplitude from 100%.

$$\text{Percent Loss} = 100 - RM(\%) - TA(\%)$$

The third step was the reference mirror fabrication. This was accomplished by using short, low power splices to fuse the coated end of the fiber to the output leg of the directional coupler shown in FIG. 6C. As the splice was made, the percent reflectance of the reference mirror was decreased by applying more splicing arcs. By monitoring the reference mirror reflected pulse amplitude, the desired reflectance was programmed by applying the proper number of splicing areas. The reflected 150 and transmitted 152 amplitudes were obtained as they were originally by using the 3.5% Fresnel reflection as a reference and taking the ratio. The only difference was that the amplitude of the Fresnel reflection before the reference mirror and after the reference mirror are different. The difference in the calculations was that the first 3.5% Fresnel must be used in the calculation of the percent reference mirror reflection, but the new 3.5% Fresnel reflection amplitude must be used in the calculation of the percent loss. The loss of the film was given by the following equation:

$$\text{Film + Splice Loss} = 1\sqrt{F2/(F \cdot (1 - RM)^2)}$$

D. Connector Mounting

Figure 7:
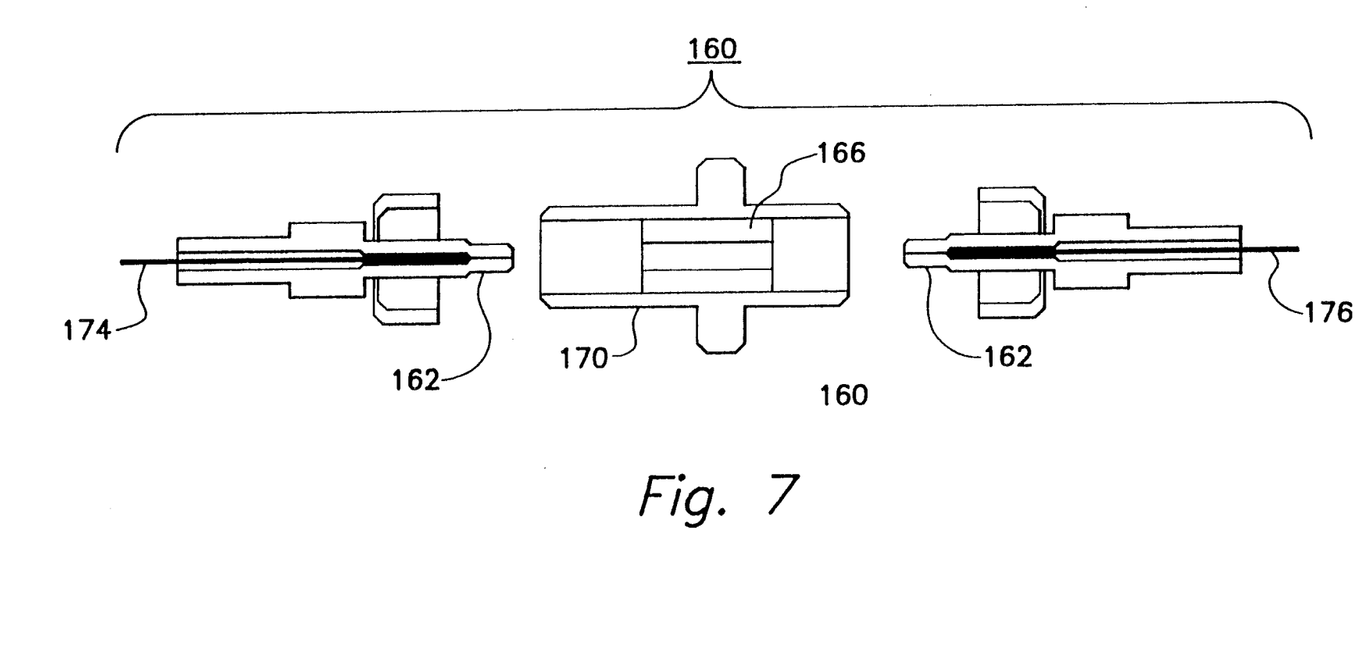
FIG. 7 shows a cross sectional view of a bulkhead connector.

The design of the signal processing system required a simple and reliable method of modifying the length of fiber 28 in the data length without the need to splice. Recent advances in the fiber-optic telecommunications industry provided the connector technology to fulfill this need. The SMA type connector 160 shown in FIG. 7 was chosen due to its compatibility with the Honeywell LED module. This type of connector has two series, the 905 and 906. The 906 series has been proven to be the most reliable for a system where the connector may be removed and reinserted. FIG. 7 shows a cross-sectional view of a stainless steel 906 series connector 160. The reduced outside diameter 162 at the end of the connector allows the use of a teflon sleeve 166 to provide enhanced alignment when mating two connectors through a bulkhead connector 170. The bulkhead connector 170 provides a means of providing a fiber 174 to fiber 176 interface through a solid wall. The 906 series connector 160 was rated for 0.9 dB insertion loss for each direction through the coupler.

The signal processing method operated in the following manner. The transmitter produced a 60 ns pulse every 1 us. This was coupled to the fiber data link through a 2×2 directional two path coupler 18 (one transmitting 180 and one receiving 182). The pulse traveled down the data link and reflected off of the reference mirror 50 and the distance sensor 56 (plus a few small reflections from fiber to fiber connections 24, 30, 32 and 48). The reflected pulses returned through the reflection path into the PIN photodiode 60. The signals were amplified by the receiver 14 and then captured by the sample and hold circuits. The output of each sample and hold circuit was connected to a digitizing oscilloscope that averaged over 250 pulses. The data was recorded and then plotted using a commercially available graphing package. The ratio of the amplitudes of the reference and sensor pulse was used to determine the distance between the fiber end and the mirror.

Figure 8:
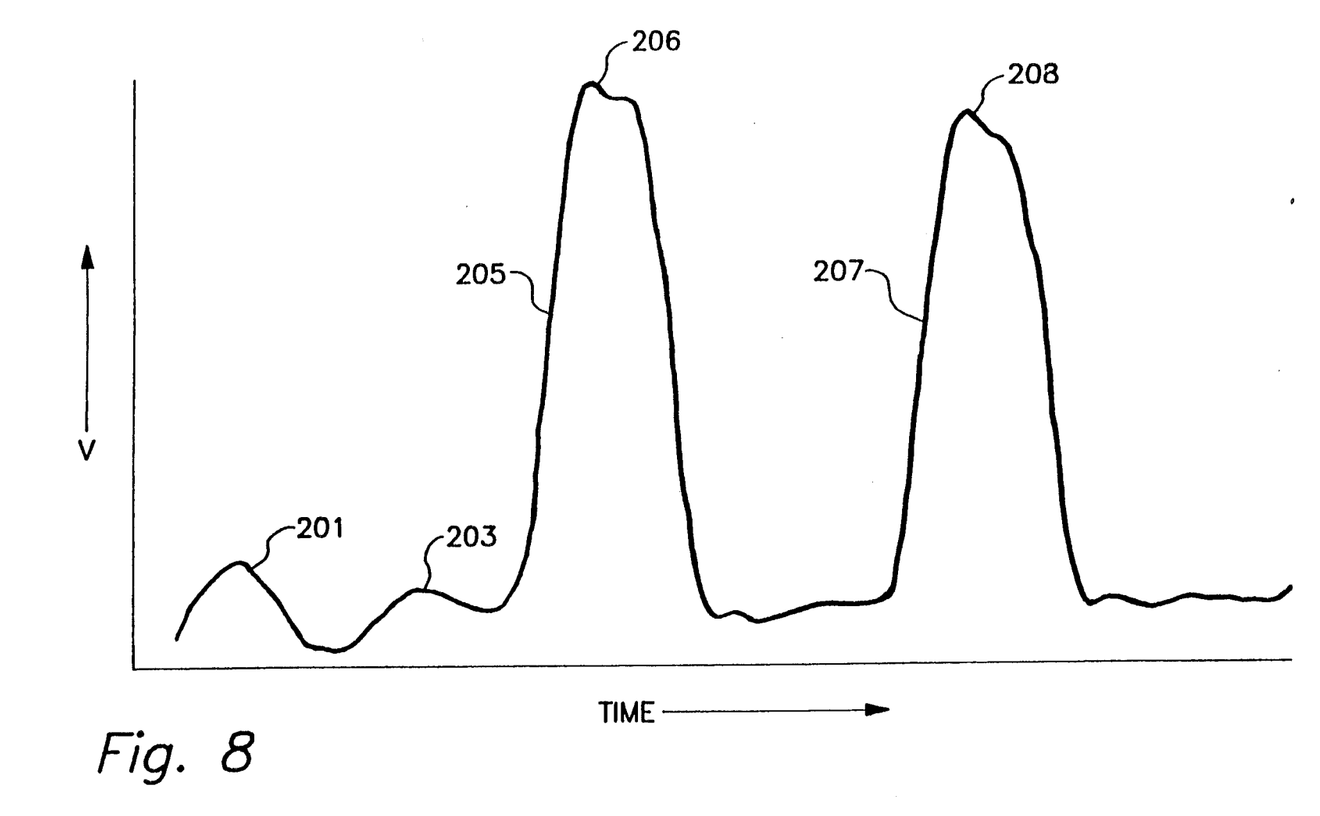
FIG. 8 shows a typical signal pattern for a reference mirror pulse and a sensor mirror pulse.

With the sensor system configured as previously outlined, the following steps were taken to acquire the sensor data. The first configuration that was tested used no bulkhead connections. The following procedure was the same for the other two configurators 30 and 32 with the exception of inserting one and two bulkhead connections respectively. The first step was the determination of the correct program to be entered into the PROM 96 to enable the sample and hold circuits to be triggered at the proper time for the sampling of the pulses. The easiest method of determining when the triggering times were to occur was the programming of a PROM 96 only for the generation of the 60 ns pulse and viewing the times of the reflected waveforms. The reflected signals were displayed on the oscilloscope before being transmitted to the sample and hold circuits 101, 102 and 103. FIG. 8 contains a 500 ns window that displays the reflection from the leg of the coupler that is in index matching fluid 201, a multiple reflection from the same leg, the reference mirror reflected pulse 205 and the sensor mirror reflected pulse 207 when no bulkheads were used. The reference pulse occured approximately 170 ns after the transmitted optical pulse and the sensor pulse occurred 330 ns after the reference pulse. Two factors effect which memory address to program. These are the sampling resolution of 20 ns and which part of the waveform was to be sampled. Sampling the waveform at its central peak allowed time for delay of the acquistion. For the fiber length of FIG. 8, the reference pulse was programmed for sampling at 200 ns 206, while the sensor was programmed for 360 ns 208. This corresponds to the PROM's tenth and eighteenth memory address, 0008 and 0011 respectively in hexadecimal. Once the proper sampling times have been established and the PROM has been programmed, the sensor system will automatically create, transmit, and control the sampling of the pulses.

The next step involved acquiring the sampled pulse amplitudes from the sample and hold chips and taking the ratio of the reference to the sensor signals. The sensor system in its prototype form used analog integrators 104, 105 and 106 to average the sample pulse amplitudes and an analog to digital conversion board in an IBM PC to acquire the date and take the ratio of the signals. To further simplify the process, a Tektronix 11401 digitizing oscilloscope was used to simulate the analog-to-digital converter. Applying the reference and sensor signals to the inputs of the oscilloscope and using a built in averaging capability, both signals were averaged over 250 pulses. Using the oscilloscope's measurement capabilities of peak-to-peak voltage, the amplitudes of both signals were acquired as the distance between the fiber end and the mirror was varied. Data was taken at varying intervals depending on the rate of change of the amplitudes. The ratio of the reference to sensor signal was calculated and plotted using a commercially available computer program called GRAPHER. Using the ratio of the two signals, the data taken was then independent of the absolute amplitudes of each signal and the digitizing accuracy of the oscilloscope, provided that both exceed the noise limit set by the optical receiver.

The embodiments of the invention in which an exclusive property or right is claimed are defined as follows:

1. Apparatus for providing an indication of a sensed parameter comprising:
   an optical fiber having first and second ends;
   transmitting means for injecting an energy pulse into the first end of said optical fiber;
   a reference mirror located in said optical fiber at a predetermined distance from the second end thereof and separating said optical fiber into first and second segments, said reference mirror being adapted to reflect a first portion of said energy pulse injected into the first end of said optical fiber and to allow a portion of the energy to pass into the second portion of said optical fiber, said first segment comprising a first fiber optic delay line, said second segment comprising a second fiber optic delay line;
   a sensor at the second end of said optical fiber, said sensor including means for variably reflecting a second portion of the energy emerging from the second end of said optical fiber back into the second end thereof, the reflectivity of the reflective means being variable in response to a sensed parameter, said fiber comprising a means for temporally displacing said second portion from said first portion; and
   receiver means associated with the first end of said optical fiber for receiving energy emerging from the first end thereof, said receiver means being adapted to compare the amplitudes of reflections of said first portion of a transmitted energy pulse from said reference mirror and said second portion from the reflective means of said sensor, whereby the parameter sensed by said sensor is indicated at said receiver regardless of variation in attenuation of energy by said optical fiber.

2. A method for transmitting analog information over an optical fiber, comprising the steps of:
   injecting an energy pulse into a first end of an optical fiber segment;
   reflecting a first portion of the energy in the energy pulse injected into the first end of the optical fiber segment back toward the first end by means of a reference mirror in the optical fiber segment located at a predetermined distance from the second end of said segment;
   reflecting a variable second portion of the energy pulse injected into the first end of the optical fiber segment back toward the first end thereof by means of a sensor mirror at the second end of the optical fiber segment, the sensor mirror having a reflectivity which is variable in accordance with analog information to be transmitted;
   temporally displacing said second portion from said first portion;
   delaying said energy pulse as it proceeds towards said reference mirror;
   delaying said energy pulse as it proceeds toward said reference mirror;
   delaying said first portion as it proceeds away from said reference mirror;
   delaying said energy pulse as it proceeds from said reference mirror toward said sensor mirror;
   delaying said second portion as it proceeds away from said sensor mirror;
   receiving at the first end of the optical fiber segment the first and second portions of the energy pulse reflected by the reference mirror and sensor mirror; and comparing the second portion of the energy pulse received from the sensor mirror with the first portion of the energy pulse received from the reference mirror to accurately determine the value of the information desired to be transmitted regardless of variations in attenuation produced by the optical fiber segment.

3. Apparatus for transmitting the analog value of a sensed parameter over an optical fiber from a sensor to a receiver, comprising:

an optical fiber having a sensing end and a receiving end;

a transmitter at the receiving end for injecting an energy pulse of a predetermined duration into the optical fiber for transmission toward the sensing end thereof;

a reference mirror in the optical fiber at a location spaced apart from the sensing end, the length of the optical fiber between the reference mirror and the sensing end being sufficient to cause a propagation delay of a duration at least as great as the duration of the energy pulse, said reference mirror being adapted to reflect a first portion of the energy pulse injected into said optical fiber by said transmitter back toward the receiving end of said optical fiber;

a fiber optic delay line disposed between said reference mirror and said transmitter;

sensing means including a mirror whose reflection coefficient varies in accordance with a sensed parameter at the sensing end of said optical fiber, the mirror of said sensor being adapted to reflect a second portion of the energy pulse injected into said optical fiber by said transmitter back toward the receiving end of said optical fiber; and receiver means at the receiving end of said optical fiber for receiving reflections of the first and second portions of the energy pulse injected into said optical fiber by said transmitter from said reference mirror and the mirror having variable reflectivity of said sensor, said receiver means further being adapted to compare the received reflections of the first and second portions to accurately determine the analog value of the sensed parameter regardless of variations in attenuation of said optical fiber.

4. The apparatus of claim 1, wherein:

said first fiber optic delay line is disposed between said reference mirror and a fiber optic connector attached to said first segment.

* * * * *